(12) United States Patent
Robb

(10) Patent No.: US 6,177,950 B1
(45) Date of Patent: Jan. 23, 2001

(54) MULTIFUNCTIONAL PORTABLE TELEPHONE

(75) Inventor: Garry Douglas Robb, Cobble Hill (CA)

(73) Assignee: AVT Audio Visual, British Columbia (CA)

( * ) Notice: Under 35 U.S.C. 154(b), the term of this patent shall be extended for 0 days.

(21) Appl. No.: 09/101,790

(22) PCT Filed: Jan. 17, 1997

(86) PCT No.: PCT/CA97/00029

§ 371 Date: Jul. 16, 1998

§ 102(e) Date: Jul. 16, 1998

(87) PCT Pub. No.: WO97/26744

PCT Pub. Date: Jul. 24, 1997

(30) Foreign Application Priority Data

Jan. 17, 1996 (GB) .................................................. 9600804

(51) Int. Cl.[7] ...................................................... H04N 7/14
(52) U.S. Cl. ........................ 348/14; 379/93.17; 379/93.23
(58) Field of Search ............................. 379/93.17, 93.23, 379/90.01, 93.02, 93.03, 93.12; 348/14, 143, 222, 207; 455/161.2; 235/462.22

(56) References Cited

U.S. PATENT DOCUMENTS

| | | |
|---|---|---|
| 4,928,300 | 5/1990 | Ogawa et al. . |
| 4,972,396 * | 11/1990 | Rafner ................................... 369/32 |
| 5,059,778 * | 10/1991 | Zouzoulas et al. ................... 235/472 |
| 5,077,784 | 12/1991 | Fujita et al. . |
| 5,111,498 | 5/1992 | Guichard et al. . |
| 5,400,068 | 3/1995 | Ishida et al. . |
| 5,412,417 | 5/1995 | Tozuka . |
| 5,412,660 * | 5/1995 | Chen et al. ...................... 370/110.01 |
| 5,436,654 * | 7/1995 | Boyd et al. ............................. 348/14 |
| 5,491,507 | 2/1996 | Umezawa et al. . |
| 5,528,285 | 6/1996 | Morikawa et al. . |
| 5,555,443 | 9/1996 | Ikehama . |
| 5,583,933 * | 12/1996 | Mark ..................................... 379/355 |
| 5,612,732 | 3/1997 | Yuyama et al. . |
| 5,613,012 * | 3/1997 | Hoffman et al. ..................... 382/115 |
| 5,666,159 | 9/1997 | Parulski et al. . |
| 5,706,290 * | 1/1998 | Shaw et al. ........................... 370/465 |
| 5,719,799 | 2/1998 | Isashi . |
| 5,748,441 | 5/1998 | Loritz et al. . |
| 5,760,824 | 6/1998 | Hicks, III . |

FOREIGN PATENT DOCUMENTS

| | | | |
|---|---|---|---|
| 4219357A1 * | 1/1993 | (DE) .............................. H03J/00/00 |
| 362075882A * | 4/1987 | (JP) ................................ G06K/9/22 |
| 404352522A * | 12/1992 | (JP) ................................. H04B/1/64 |
| 405284491A * | 10/1993 | (JP) ................................. H04N/7/14 |
| 406141306A * | 5/1994 | (JP) ................................. H04N/7/14 |
| 407162407A * | 6/1995 | (JP) ................................ H04L/9/00 |
| 409107399A * | 4/1997 | (JP) ................................ H04M/1/66 |

OTHER PUBLICATIONS

Patent Abstract of Japan 07046556, published Feb. 14, 1995.
Patent Abstract of Japan 08294030, published Nov. 5, 1996.
Patent Abstract of Japan 09083982, published Mar. 28, 1997.
Patent Abstract of Japan 10075287, published Mar. 17, 1998.
Patent Abstract of Japan 10065780, published Mar. 6, 1998.

* cited by examiner

Primary Examiner—Curtis A. Kuntz
Assistant Examiner—Melur Ramakrishnaiah
(74) Attorney, Agent, or Firm—Morgan & Finnegan, L.L.P.

(57) ABSTRACT

A personal communication device includes a display for displaying data and video signals; a loudspeaker for generating an audible signal; a microphone for receiving an audio signal; a keypad for entering data; a telecommunications interface for receiving and transmitting information; and an internal multi-position and multi-function reading head for producing an image signal when in a first position using a first lensing and for reading for image conversion using a second lensing when in a second position.

41 Claims, 13 Drawing Sheets

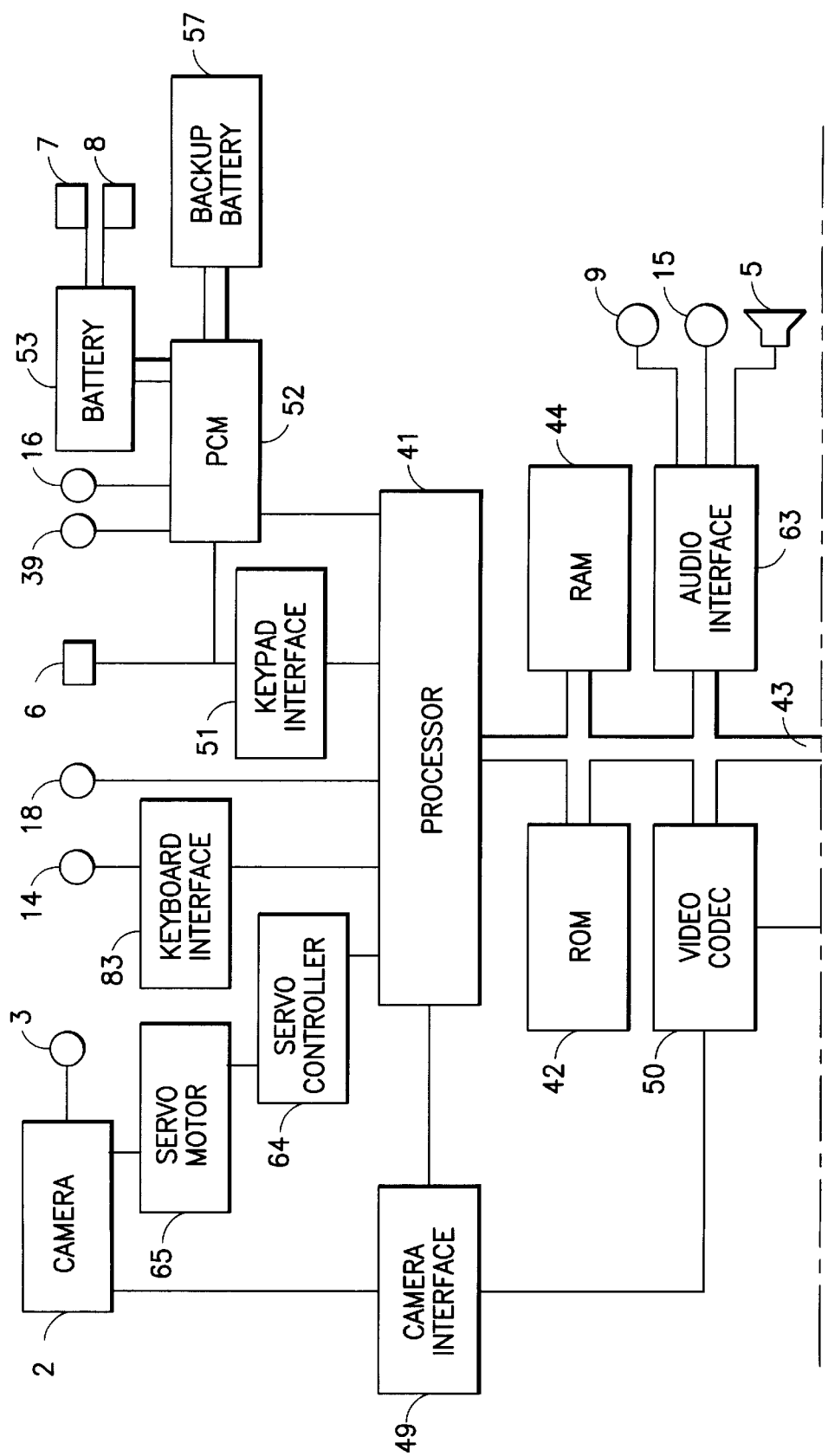

MULTIFUNCTIONAL PORTABLE TELEPHONE

This invention relates to portable video teleconferencing systems, portable data entry systems, portable computer systems, and to applications of such systems and equipment for use therewith.

The present invention, known as the "Multiphone" is a multi-functional hand held portable device, which provides a fully integrated video teleconferencing, data entry, and image capture system. A preferred embodiment of the "Multiphone" comprises of the following elements:

- An adjustable and/or interchangeable reading head for capturing data and/or images.
- A microphone and associated circuitry to eliminate much of the background noise to enable the capturing of audio data and/or voiced commands.
- Rewritable storage for storing information relating to such captured data and/or images.
- A controller to receive and process the input signals from the reading head and/or microphone, to respond to sensed commands, and to control the function of the Multiphone.
- A display screen for displaying a representation of the captured data and/or images, and/or stored information.
- A keypad and/or touch screen area to input commands and/or data.
- A telecommunications interface for telephonic transmission and/or reception of information related to the captured data and/or images and/or stored information, to other compatible devices and/or remote processing centres.
- A Radio Frequency (RF) interface for RF transmission and/or reception of information related to the captured data and/or images and/or stored information, to other compatible devices and/or remote processing centres.
- A standard RS232 interface for connection to other compatible devices, through a standard RS232 cable and/or radio frequency (RF) link.
- Multiple Personal Computer Memory Card International Association (PCMCIA) slots to allow the loading of standard PCMCIA compatible Memory and Input/Output (I/O) peripheral cards into the device to increase its functionality.
- Plug-in receptacles for a Video Display Unit (VDU) and a standard personal computer (PC) keyboard to allow the utilisation of the device in a similar fashion to a personal computer terminal.
- Plug-in receptacle for an earphone device.

The provision of the hand held unit having an integral reading head, controller, rewritable storage, display, touch screen area, keypad and telecommunications interface enables the unit to be used in an efficient and self-contained manner for the capture, processing, storage, display and transmission of data. In particular the inclusion of the display allows the user to verify and/or view the data being captured without taking his or her eyes off the areas in which data capture is taking place.

In a preferred embodiment of the device, the telecommunications interface is integrated into the hand held unit and enables captured data and/or stored data and/or commands to be transmitted to and/or received from other compatible devices and/or remote processing centres via a telephone network. Preferably the telecommunications interface is an interface for connection to a wireless telephony network, such as a cellular telephone network interface. This provides for a particularly advantageous implementation of the invention, where the hand held unit can be operated in a similar fashion to a standard portable cellular phone, and can thus be used without the need to plug the device into, for example, a conventional wired telephone network. Cellular telephone networks are now common place and give a very wide area of coverage. This facilitates the use of the hand held unit in several convenient locations, for example, a user's home or workplace.

Alternatively, the telecommunications interface can be a satellite telephone network interface, or some other form of wireless telephone interface, for example a telephone interface for a telephone network based on highly localised transponder stations. Where the telecommunications interface is intended to interface with an analogue telephone network, the telecommunications interface includes a modem.

In other embodiments of the device the telecommunications interface could include radio frequency (RF) and/or optical transmitters and receivers, or indeed other types of transmitters and receivers.

In a preferred embodiment of the device one or more standard PCMCIA card slots are incorporated into the hand held device to increase both its overall functionality and flexibility. Consequently the hand held unit can utilise additional PCMCIA cards to achieve the desired functionality for the users potential application.

PCMCIA cards can be divided into two functional categories, Memory and Input/Output (I/O) cards. Example types of each category are given below and include:

Memory Cards containing one of the following technologies:
- Masked ROM
- Battery Backed SRAM
- UV EPROM
- One Time Programmable (OTP) ROM
- EEPROM
- FLASH PROM I/O cards containing one of the following peripherals:
- Local Area Network Interfaces
- FAX Modems
- Hard Disk
- Cellular Phone Interfaces
- Wireless Communications
- 3270 Terminal Emulators
- Serial, Parallel and SCSI Ports
- Imaging Cards
- Data Encryption
- Data Acquisition The provision of the hand held unit having one or more standard PCMCIA card slots consequently enables the unit to utilise PCMCIA cards to meet the memory and I/O requirements of any potential user applications.

In a preferred embodiment of the invention an easily attachable and detachable rechargeable power source is included for connection to the device. An integrated and/or separate charger unit can then be provided with associated electrical connections for recharging the rechargeable power source.

In some embodiments of the invention, the system can comprise a base unit separate from the hand held unit, wherein the base unit and the hand held unit are provided with a wireless data link which is operable for bidirectional data transfer between the hand held unit and the base unit, and wherein the base unit includes a telecommunications interface for telephonic transmission of data and/or images and/or commands. In this embodiment the wireless data link preferably comprises, in the base unit and the hand held unit, radio frequency (RF) transmitters and/or receivers which allow a two way RF data link for transferring data from the hand held unit to the base unit and/or from the base unit to the hand held unit. This transfer of data can consequently take place independently of whether the hand held unit is in the base unit or not. In other embodiments it could comprise respective optical, rather than radio frequency, transmitters and receivers, or indeed other types of transmitters and receivers.

A system comprising a hand held unit with or without a base unit as described above, can also include means for displaying a plurality of selectable items with associated data sources for user selection of an item by operation of the hand held unit and a remote processing centre for processing user selections transmitted from the hand held unit. The controller in the hand held unit is preferably arranged to respond to appropriate commands input, for example via the reading head, to issue coded instructions via the telecommunications interface to the data processing centre and to receive programming data (e.g., relating to information for selectable items) from the programming centre for storage in the hand held unit.

In a preferred embodiment of the invention, the hand held unit includes a three way semi-lockable rotational pivot and/or a rotational reflective mirror(s) and/or an electronically manipulated substrate, all of which can be electronically controlled and/or adjusted by an adjustable thumbwheel and/or keypad, either of which can both change the viewing position of the reading head and alter the primary function of the system. The rotational thumbwheel is preferably a small circular device which is located in a suitable and comfortable position on the top or side of the device preferably nearest the display screen. Depending on the viewing position of the reading head the device is programmed to serve various primary functions.

Preferably the reading head has three positions:

In position 1 the reading head is in a vertical position and faces up to point at the user.

In position 2 the reading head is in a horizontal position and faces out horizontally from the user.

In position 3 the reading head is in a vertical position and faces down to point away from the user.

In a preferred embodiment of the hand held unit some potential applications for these three positions are:

Position 1: Allows the capture of the end users face to enable a video teleconferencing capability between another compatible device either in the field, at home or place of work. This feature simply adds a better medium of communication compared with only voice transmission. In this position the user would hold the device much like a calculator rather than a portable phone device and speak into the microphone.

Position 2: Allows the user easy access to capture images to facilitate the identification of products and/or items and/or persons, for example information such as bar codes, dot codes, blob codes or in effect any suitably coded data or distinctive feature which can be used for identification purposes.

Position 3: Allows the user to capture data and/or images below the device while viewing the self same data and/or image on the display screen. The hand held units functionality is essentially the same as in position 2 however this position facilitates the capture of documents, fingerprints, and signatures, or any data and/or image pointed to by the user. With the inclusion of character or image recognition logic this allows graphical or alphanumeric data representations to be captured directly. This captured data and/or image can then be stored and/or transmitted to other compatible devices and/or remote processing centres. Other potential devices include printers and fax machines, giving the functionality of a photocopier.

In each position the controller in conjunction with associated lensing optimally determines the correct focusing to allow the correct capture of information and assists the user in obtaining a good read, which is suitably indicated by a combination of audio and/or visual feedback. Thus, for example, when information is correctly read, a beep can be sounded and a green indicator light illuminated, and when information is incorrectly read, two beeps could be sounded and a red indicator light illuminated. Alternatively, appropriate synthetic or recorded voice messages could be output and a visual indicator displayed on the display screen.

In a preferred embodiment of the invention, the hand held unit includes a keypad area to allow the user to input commands and data, or alter the operational states of the device to predetermined functions, e.g. power-up and power-down. Furthermore the keypad area can be complemented or replaced by a touch screen area which can function as a keypad and/or pen based scribing facility.

Preferably, there is provided a means for scrolling the display in four directions, up, down, left, and right to allow the display of more than one data item. The scrolling of the display enables a large number of items to be accessed with a relatively compact display. A number of alternative methods for scrolling the display can be incorporated into the hand held device, such as through the use of the touch screen and/or keypad areas, and/or voiced commands.

Consequently a system in accordance with the invention, especially a system comprising a hand held unit including a telecommunications interface for use with a wireless telephony system, such as a cellular network telephone system, provides a particularly advantageous device for use, for example, for "home shopping". It enables the user to make shopping selections from a catalogue or from a series of options displayed on a television screen from the comfort of his or her home without the need to connect the device to a conventional telephone network. Additionally such a system finds particular application where the user of the system is travelling from place to place and may need to perform data entry functions when they are far from a conventional wired telephone network socket.

The system as described above preferably includes some form of user verification. This user verification can take many forms, such as a verification card (e.g., a credit card, a smart card, a payment or other validation card), a personal identification number (PIN), a signature, a fingerprint, a voice signature, or any other such information which can be safely used for verification purposes. Consequently the operation of the hand held unit can be limited to suitably authorised users.

Exemplary embodiments of the invention will be described hereinafter, by way of example only, with reference to the accompanying drawings in which like reference numerals are used for like features and in which.

Figure 1A:
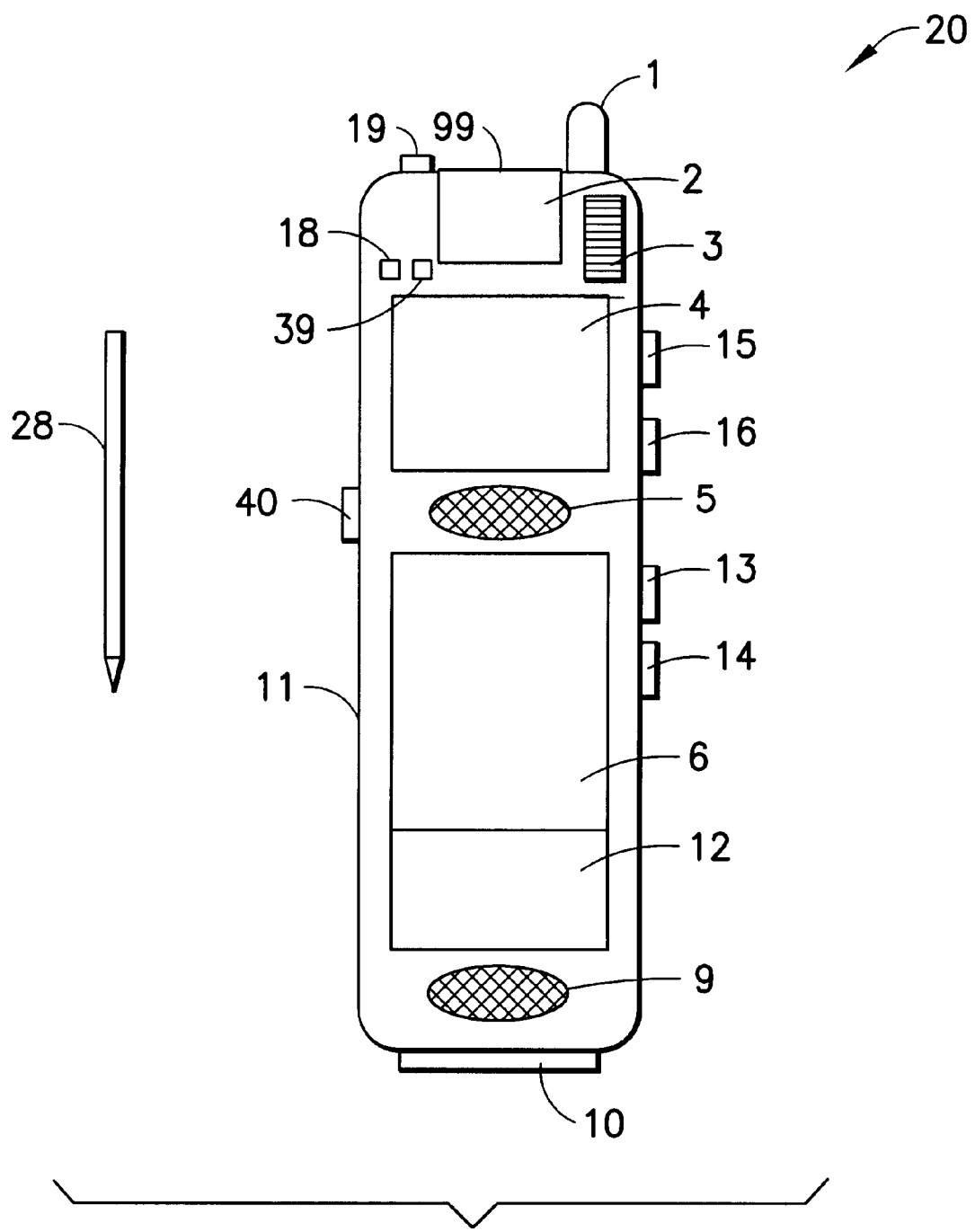
FIGS. 1A and 1B are schematic views of a substantially rectangular shaped, hand held device.
Figure 1B:
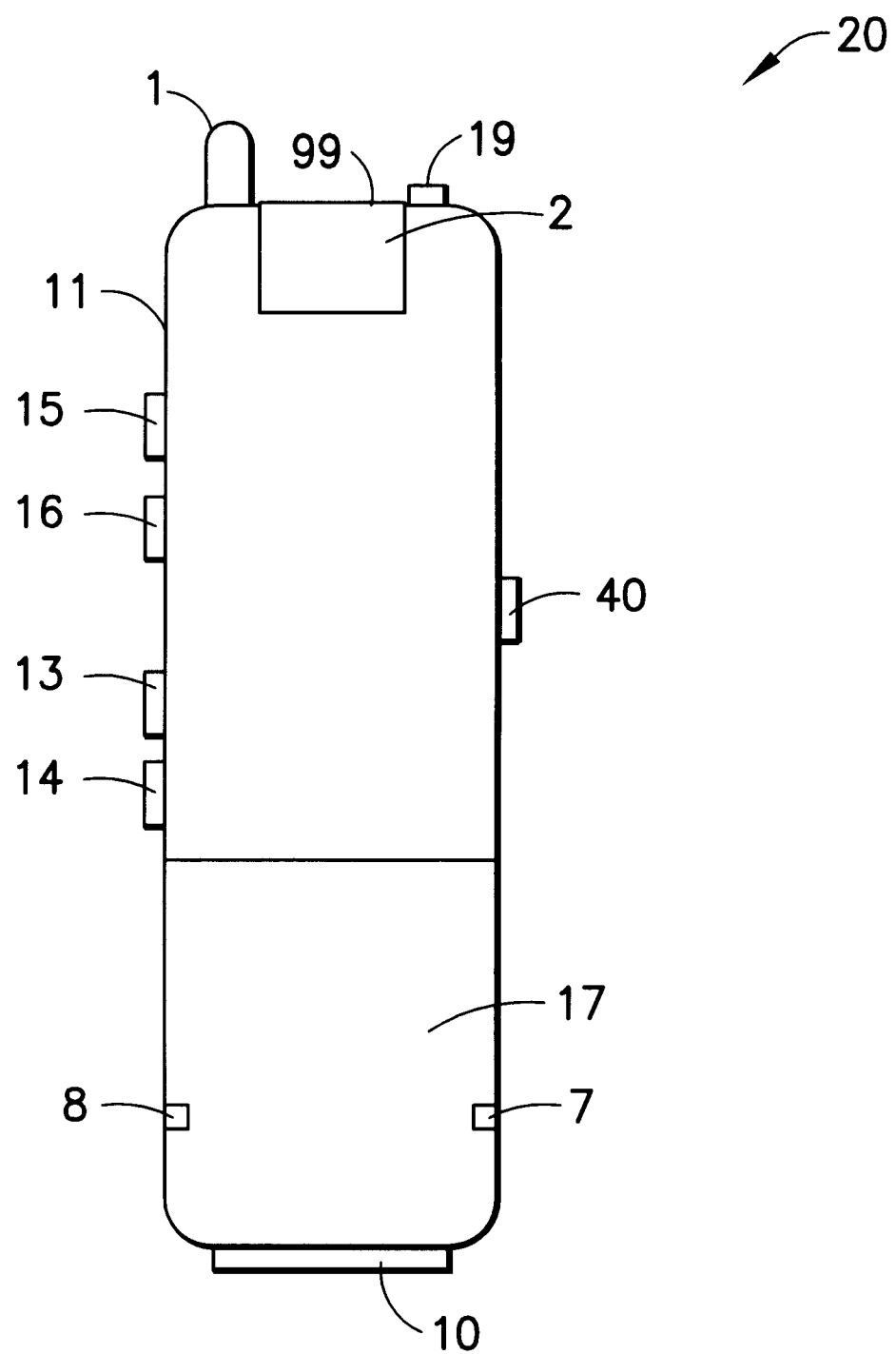

FIGS. 1A and 1B are schematic views from above and below respectively, of one embodiment of the hand held device which is substantially rectangular in shape and which will hereinafter, for reasons of conciseness only, be referred to as the "Multiphone 20". The Multiphone 20 is intended to be held for essentially one handed operation in the palm of the hand, and grasped between the thumb and forefingers, in a similar manner to a standard mobile telephone.

The Multiphone 20 has a rectangular body 1, in the present example, external dimensions are approximately 180 mm by 70 mm by 20 mm (Height×Width×Depth respectively), although the dimensions may be larger or smaller as desired subject to technical limitations. An aerial 1 suitable for wireless communications connected to associated transmitter and receiver logic, and a reading head 2, for example a camera or infra-red optical reading head (e.g. laser diode), suitable for capturing data and/or images, are located at one end of the Multiphone 20. Other types of reading head may be provided. The reading head is preferably interchangeable through the use of a clip-on enclosure 99, to allow the use of different types of reading heads. An adjustment thumbwheel 3, connected to the clip-on enclosure 99 by suitable means (e.g. a gearbox), allows the reading head to be adjusted to various working positions.

On the upper surface of the Multiphone 20 shown in FIG. 1A a display screen 4, is provided to convey functional information to the user. The display screen preferably comprises a conventional two-dimensional colour array of pixels which can be selectively activated in order to provide the display of a wide range of displayable items. However, in a low cost version of the Multiphone 20, the display may be configured only to display a predetermined range of monochrome characters and symbols, this reducing the complexity of the display and the controlling logic and thus reducing the cost as will be well understood by one skilled in the art.

Any suitable display technology can be used which enables the displayed information to be read over a wide enough angular range such that it can always be read by the user when the Multiphone 20 is held at various angles suitable for capturing data and/or images. In this way it is not necessary to change the orientation of the Multiphone 20 in order to read the display.

A keypad area 6 and a touch screen area 12 are provided to allow the user to input commands and/or data. These areas are used to control the basic operation of the Multiphone 20. A removable stylus pen 28 is provided for use with the system to allow the touch screen area 12 to incorporate a pen based scribing facility. This pen is conveniently located in a retractable compartment 19 which is located in a suitable and comfortable position on the top or side of the device preferably nearest the top of the device. The user can also interact with the unit via the speaker 5, the microphone 9, and an earphone (not shown) via the earphone plug-in receptacle 15. Additionally the unit can be connected to a Video Display Unit (VDU) (not shown) via the plug-in receptacle 13, a keyboard (not shown) via the plug-in receptacle 14, and a RS232 cable (not shown) via the plug-in receptacle 40. Various PCMCIA memory and I/O cards can be incorporated into the hand held unit through the use of the PCMCIA slot(s) 10, as will be described in more detail later.

The Multiphone 20 can be powered and recharged from a standard AC/DC power supply (not shown) with a suitable jack plug via the plug-in receptacle 16. On the underside of the Multiphone 20, shown in FIG. 1B, first and second electrical contacts 7 and 8 and a removable battery cover 17 covering a battery compartment are suitably located. As an alternative to a compartment for removable batteries, a removable and/or fixed rechargeable battery pack could be provided instead. In all cases the electrical contacts 7 and 8 are conveniently arranged to co-operate with corresponding contacts 24 and 25 in the base unit 27, yet to be described, for charging the rechargeable batteries.

In addition to the display 4 a set of indicator lights 18 and 39, (e.g. LED's), are used to advise the user on the correct usage and current operational state of the Multiphone 20. The indicator light 18 is used to report successful capture of data and/or images, and is also used during video teleconferencing to indicate the correct usage of the device. The indicator light 39 is used to report when the Multiphone 20 is in the process of recharging its rechargeable batteries and is also used to inform the user when the batteries require to be recharged or replaced by flashing on and off repeatedly when the Multiphone 20 is in use.

Turning now to FIGS. 2A, 2B, 2C, and 2D, which are schematic views from above, face on, side on, and again side on, respectively, of one embodiment of the base unit 27 for use with the Multiphone 20 of FIGS. 1A and 1B.

The base unit 27 includes a generally rectangular housing 82 with two flanges 29 and 30 which hold the Multiphone 20 in a resting position when the device is in the base unit. The resting position is also determined by the location/recharging platform 31 which contains the first and second electrical contacts 24 and 25. As previously stated these electrical contacts are conveniently arranged to co-operate with the corresponding contacts 7 and 8 in the Multiphone 20 for charging the rechargeable battery (53, FIG. 3). The two flanges 29 and 30 ensure that when the Multiphone 20 is located in the base unit 27 that it is properly secured. Additionally the location/recharging platform 31 provides sufficient clearance at the base of the Multiphone 20 to ensure continued use of any PCMCIA cards which may be occupying the PCMCIA slot(s) 10.

An indicator light 26 is used when the rechargeable battery (53, FIG. 3) in the Multiphone 20 is inserted in the base unit to indicate that the battery is charging. The rechargeable battery can be placed into the base unit on its own or when connected to the Multiphone 20.

Electrical power is supplied to the base unit 27 from a standard AC/DC power supply (not shown) via a power cable 21 with a suitable jack plug (not shown) plugged into the plug-in receptacle 38. The side of the housing 82 is also provided with a socket 37 for a standard telephone plug for connecting the base unit 27 to a telephone line 22.

Fold away legs 33 and 35, which are connected to the base unit 27 via pivots 32 and 34 respectively, allow the user to alter the viewing angle of the Multiphone 20 when located in the base unit 27.

Figure 2A:
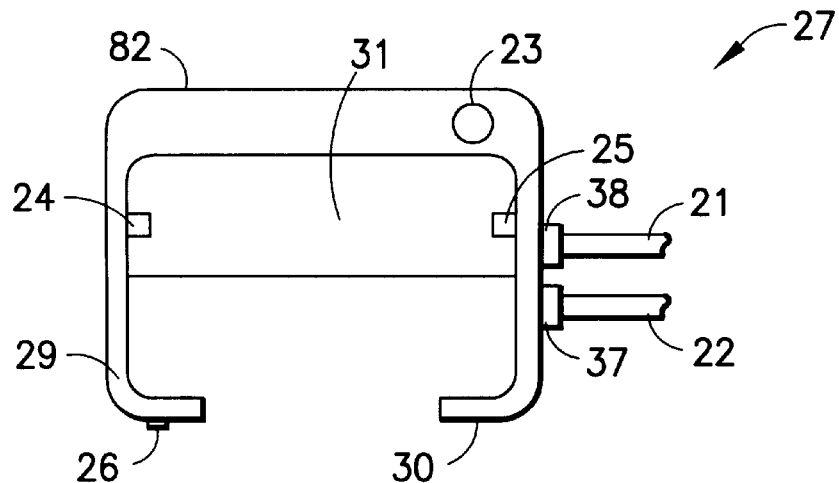
FIGS. 2A, 2B, 2C and 2D are schematic views of a base unit for use with the hand held device of FIGS. 1A and 1B.
Figure 2B:
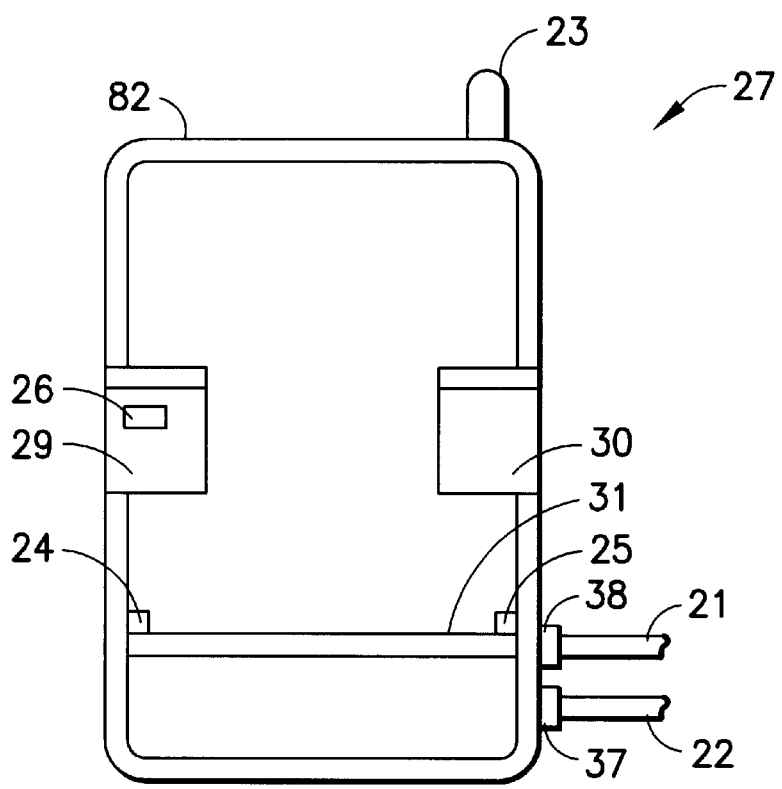
Figure 2C:
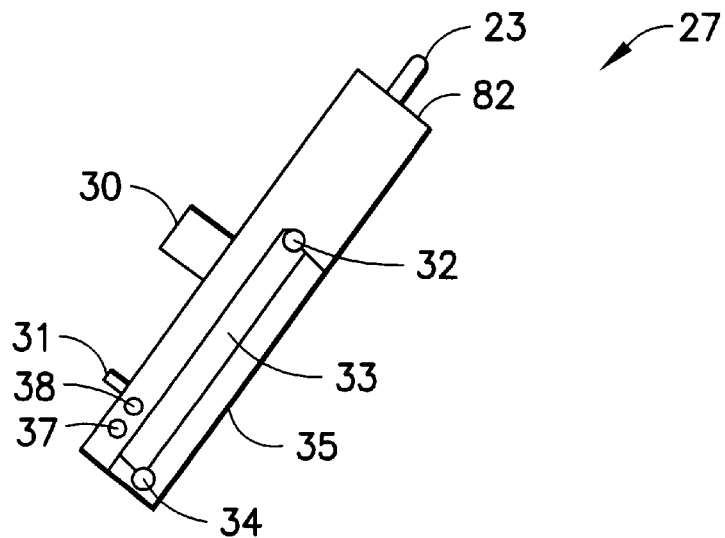
Figure 2D:
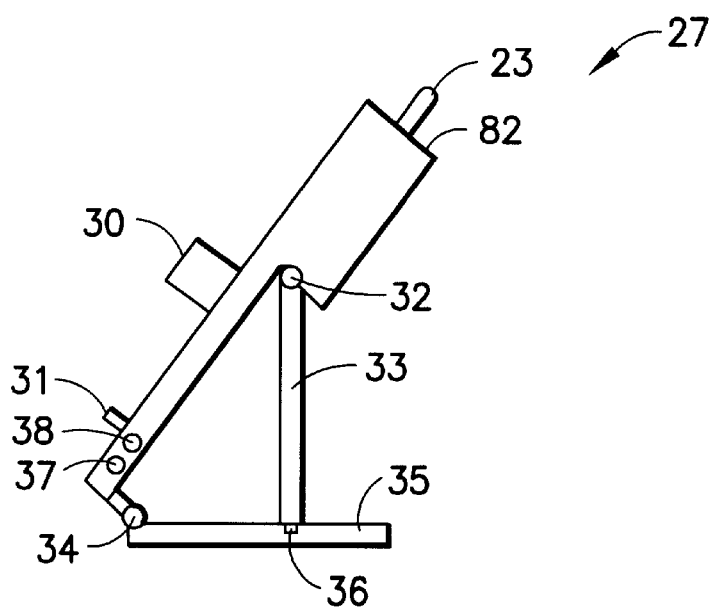

FIGS. 2C and 2D show schematics views of the base unit from side on to illustrate their function. Leg 35 can be unclipped from the main body of the base unit 27, and positioned via pivot 34. In doing so, the leg 33 can also be positioned via pivot 32 and a semi-lockable sliding guide 36.

An aerial 23 suitable for wireless communication, connected to associated transmitter and receiver logic, is located on the top of the base unit 27. This aerial 23 in conjunction with the aerial 1 located on the Multiphone 20, enables the wireless transferred of data between the base unit 27 and the Multiphone 20.

Figure 3B:
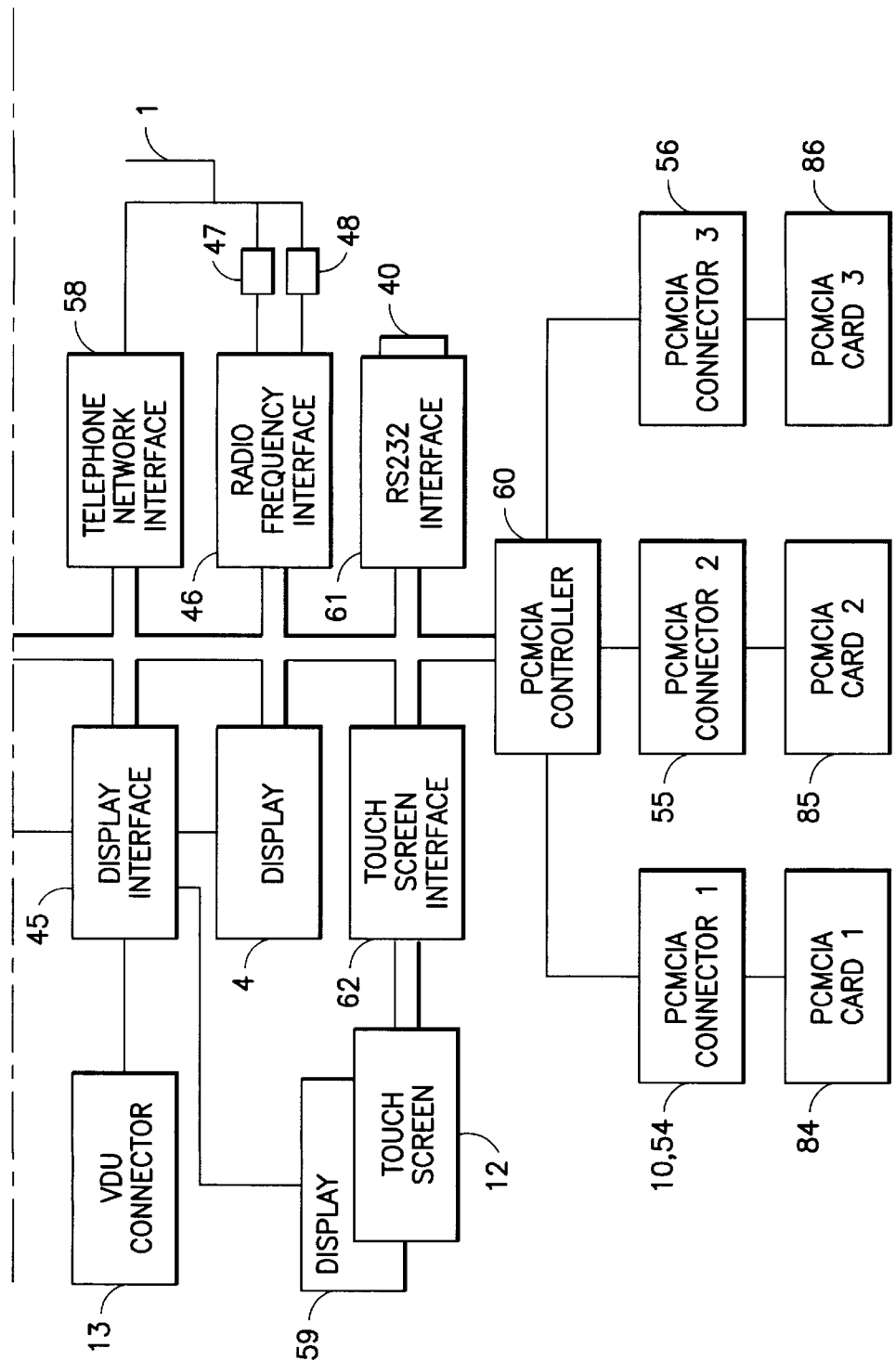
FIG. 3 is a schematic block diagram of the functional elements of the first example of a hand held device as shown in FIGS. 1A and 1B.

Turning now to FIG. 3, which is a schematic block diagram of the functional elements of the Multiphone 20. A processor 41 is preferably formed by a conventional programmable microprocessor (e.g., an Intel 8031, an Intel 80386, etc.), although a special purpose or specially configured unit (e.g., a Digital Signal Processor (DSP) and/or an ASIC) could alternatively be used (compare FIG. 9). A read only memory (ROM) 42 is connected via a bus 43 to the processor 41 for the storage of control programs, data and images. The ROM 42 can be implemented by any appropriate technology, for example by a flash PROM. A random access memory (RAM 44 (for example a 128 K low power static RAM, or higher capacity RAM, e.g., a 256 K, 512 K, 5 Mb, etc., RAM) is connected to the processor via the bus 43. The RAM 44 is used as working storage and for the storage of data and images captured using the camera 2.

Signals relating to data captured by the camera 2 are passed via the camera interface 49 to the processor 41 to be processed. The camera interface 49 also provides the video CODEC 50 with a digital representation of the captured data from the camera 2, where it can be suitably processed for display and/or telephonic transmission.

An indicator light 18, connected to the processor 41, is used to report successful capture of data and/or images from the Camera 2, and is also used during video teleconferencing to indicate the correct usage of the device.

The camera interface 49 carries out all the necessary signal conditioning as required on receiving signals from the camera 2. The signal conditioning will depend on the exact configuration of the camera and preferably comprises signal conditioning to enable accurate analogue-to-digital conversion (ADC), with sufficient buffering of the captured data as will be apparent to one skilled in the art.

In a preferred embodiment of the device the camera 2 will include an integrated image sensing array and associated signal processing circuitry with all the necessary support circuitry to produce a fully functional camera delivering a fully formatted composite video signal and automatic exposure control. The camera 2 preferably also includes a processor for sensor control reduction, a voltage regulator for power supply control and an emitter-follower output buffer to directly drive a standard Video Display Unit (VDU). An example of such a camera is the VVL1063 miniature monochrome on chip camera.

The position of the camera 2 can be adjusted via the thumbwheel 3 and/or a servo motor 65. The servo motor 65 is connected to the processor 41 via a servo controller 64. Consequently the user can alter the primary function of the Multiphone 20, as mention previously, via the thumbwheel 3 and/or the keypad 6. A more detailed discussion of the mechanical function of the servo motor 65 and thumbwheel 3 will be given with reference to the clip-on enclosure 99, which is described later in FIG. 6.

A keypad 6 is connected via a keypad interface 51 to the processor 41. An additional keyboard (not shown) can also be connected to the processor 41 via a keyboard interface 83 through the keyboard plug-in receptacle 14. The keypad 6 is also connected to a power control module (PCM) 52. This is because one of the keypad keys serves as a "power-up" key for turning the Multiphone 20 on or powering it up after it has been powered down. The PCM 52 responds to the operation of this key in a powered down state to connect the battery 53 to the processor 41.

The PCM 52 also controls the charging of the main battery 53 and the backup battery 57 when the contacts 7 and 8 are connected to the corresponding contacts 24 and 25 in the base unit 27, or when a standard AC/DC power supply jack is connected to the AC/DC power supply plug-in receptacle 16, which is also connected to the PCM 52. The indicator light 39 (e.g., an LED) is connected to the PCM 52 to indicate when the battery 53 is being charged and is also used to inform the user when the batteries require to be recharged or replaced by flashing on and off repeatedly when the Multiphone 20 is in use.

A display interface 45, which connects the displays 4 and 59 to the bus 43, responds to display instructions from the processor to drive the displays in a conventional manner. The display interface also incorporates the necessary logic to drive a standard Video Display Unit (VDU) via the VDU connector 13.

A touch sensitive screen 12 for the display 59 is included in the Multiphone 20 to incorporate a general purpose touch sensitive area. A touch screen interface 62 couples the touch sensitive screen to the bus 43 so that data sensed by the touch sensitive screen can be communicated to the processor 41. Although FIG. 3 shows a touch sensitive screen 12 (e.g., an overlay) separate from a conventional display screen 59, any applicable touch sensitive screen technology can be used, either though the use of an addition to an existing conventional display screen, or the use of a display screen with integral touch sensitivity. One or more touch sensitive areas can be defined on the touch sensitive screen area, in combination with the data displayed on the display screen, for the entry of commands and/or the selection of displayed items. In particular, the processor 41 can be arranged to display a menu of user selectable items and to be responsive to a location at which the screen is touched for input of a user selection of a menu item. The touch sensitive screen can then thus be used as a dynamic and reconfigurable user interface. Touch screen entry can be used in place of or in addition to the entry of commands from the keypad 6, and voiced commands. Additionally the touch screen area can configured as a general purpose scribing area to allow the entry of data and written commands, and can be used for security purposes through the use of signature recognition.

An audio interface 63 carries out all the necessary signal conditioning as required to output audio signals to the speaker 5 and earphone plug-in receptacle 15, and to receive audio signals from the highly sensitive microphone 9. In a preferred embodiment of the device the audio interface and/or the processor 41 will perform all necessary noise reduction.

The Multiphone 20 can transmit and receive data via the RS232 interface 61, the radio frequency (RF) interface 46 and the telephone network interface 58 as will be described in more detail below. In other embodiments of the Multiphone 20 the device can also include other interfaces such as a fibre optic interface and/or a standard parallel interface as will be appreciated by one skilled in the art.

A standard RS232 connector 40, connected to the bus 43 via a RS232 interface 61, is provided to allow the connection of other compatible devices to the Multiphone 20, through a standard RS232 cable and/or a radio frequency (RF) link.

A radio frequency (RF) interface 46 is also connected to the bus 43 to convert data to be transmitted into signals for driving the RF transmitter 47, and converts signals from the RF receiver 48 into data to be passed to the bus 43. The RF transmitter 47 and RF receiver 48 are connected to the aerial 1, which focuses and converts RF energy for reception and transmission into space. This radio frequency interface 46 consequently enables wireless communication between the Multiphone 20 and any other compatible device over a limited range, typically 50 to 1000 meters.

A telephone network interface 58, incorporating transmitter and receiver logic designed to operate at higher frequencies, is connected to the bus 43 to allow wireless communication between the Multiphone 20 and any other compatible device over a longer range, utilising a standard cellular and/or satellite network. The telephone network interface 58 is connected to the aerial 1. A more detailed discussion of the functional elements of the telephone network interface 58 is given later with reference to FIG. 4.

Since the transmitter and receive logic of both the RF interface 46 and the telephone network interface 58 utilise the same aerial 1, it is necessary that the processor 41 can control their operational states. Additionally since it is also essential that the aerial 1 is designed to operate over a wide frequency range, an expandable and/or replaceable and/or interchangeable aerial can be suitably provided.

The Multiphone 20 includes a PCMCIA controller 60 to manage the interface between the PCMCIA cards 84, 85, and 86, and the bus 43. The PCMCIA controller 60 is connected to the PCMCIA cards 84, 85, and 86 via standard 68 pin PCMCIA connectors 54, 55, and 56. A PCMCIA power interface (not shown), which is incorporated into the power control module (PCM) 52, provides the PCMCIA cards 84, 85, and 86 with all their necessary power and voltage requirements.

In a preferred embodiment of the device the PCMCIA controller 60 will consist of a suitable chipset which is commonly available from several IC manufactures. Alternatively the PCMCIA controller 60 can be implemented using a Field Programmable Gate Array (FPGA) and/or an Application Specific Integrated Circuit (ASIC), or indeed any other comparable technology.

The processor 41 is programmed by means of control programs and data stored in the ROM 42 and in use, in the RAM 44, to receive signals from the camera interface 49, to interpret those signals and to derive data therefrom which are displayed on the display 4 and which can be stored in the RAM 44 or any suitable PCMCIA memory devices occupying one or more of the PCMCIA slots 54, 55, or 56.

Figure 4:
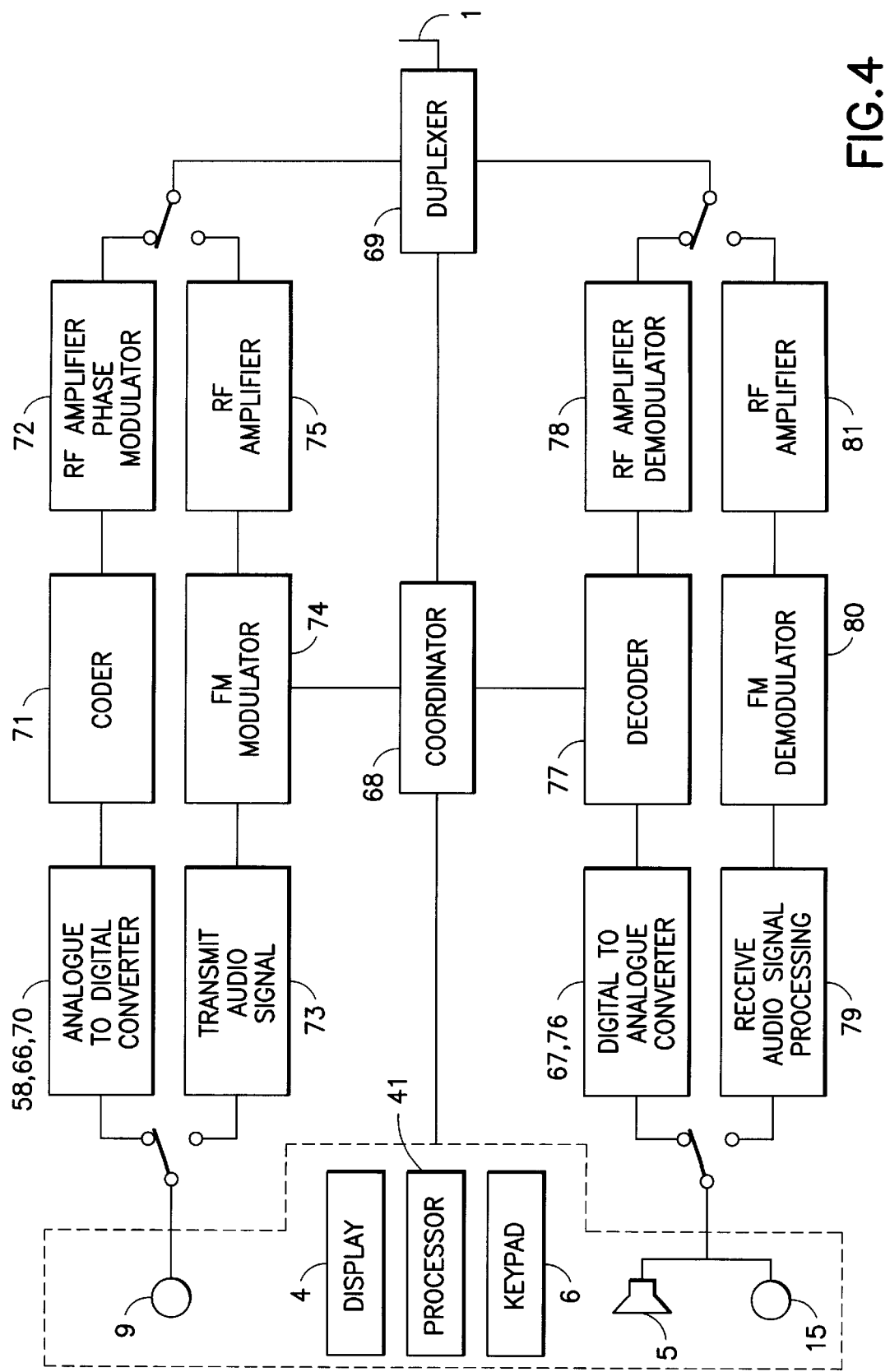
FIG. 4 is a schematic block diagram of the functional elements of a telephone network interface which forms part of the hand held device as shown in FIGS. 1A and 1B.

FIG. 4 illustrates in more detail the telephone network interface 58 shown previously in FIG. 3. The telephone network interface 58 comprises a duplexer 69 which is connected to an aerial 1. The duplexer 69 is connected to a transmitter 66 and to a receiver 67, the function of which are synchronised by the coordinator 68. Both the transmitter and the receiver support both analogue FM and digital time division multiple access (TDMA) schemes. The transmitter 66 converts the audio signal to a radio frequency (RF) signal, and the receiver 67 converts an RF signal to an audio signal. The aerial 1 focuses and converts RF energy for reception and transmission into space. The transmitter receives a suitably conditioned audio signal from the microphone 9, whilst the receiver transmits an audio signal through the speaker 5 and/or earphone socket 15, all via the audio interface 63 (not shown).

Figure 5:
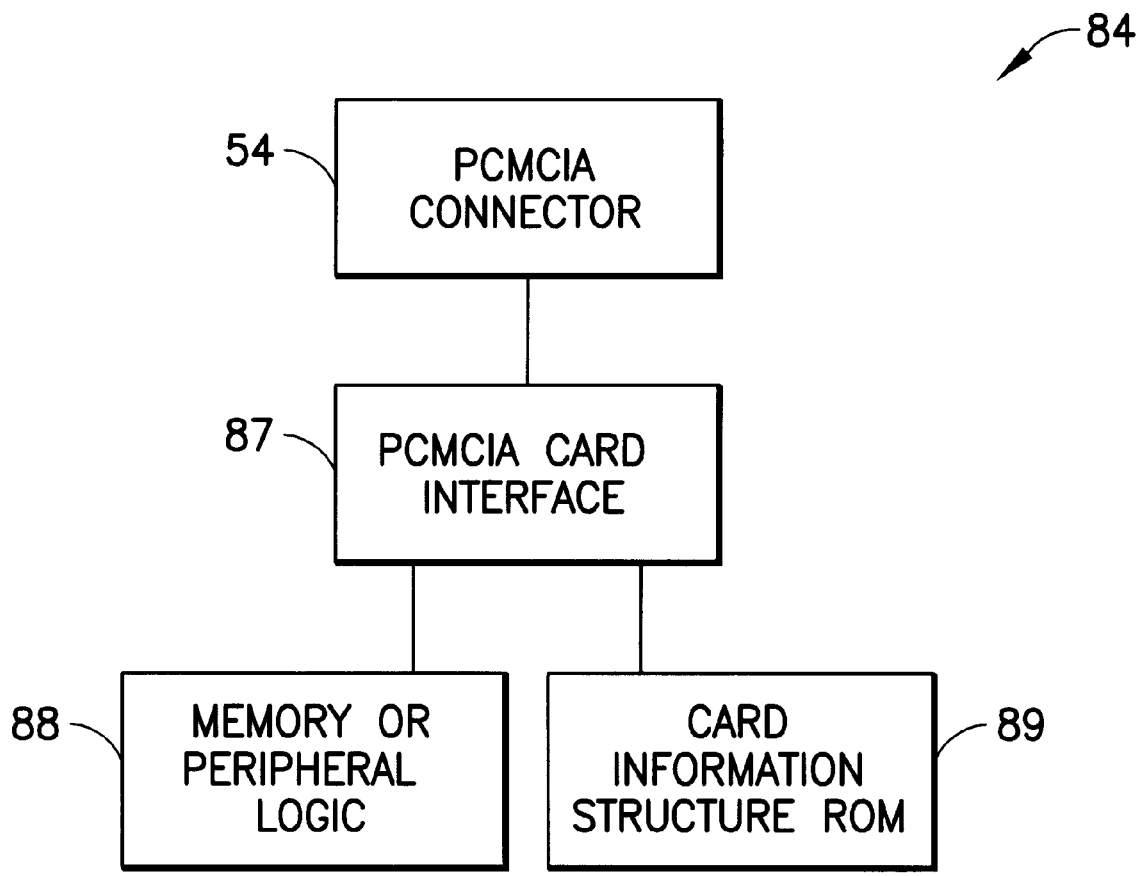
FIG. 5 is a schematic block diagram of the functional elements of a PCMCIA Card for use with the hand held device of FIGS. 1A and 1B.

FIG. 5 is a more detailed schematic block diagram of the functional elements of the PCMCIA Card 84 for use with the Multiphone 20 as shown in FIGS. 1A and 1B. The PCMCIA Card 84 consists of three functional elements:
PCMCIA Card Interface 87
Memory or Peripheral Logic 88
Card Information Structure (CIS) ROM 89

The PCMCIA card interface 87 of the PCMCIA card 84 contains all the necessary elements required to implement the desired functionality of the PCMCIA card and typically contains the following blocks:
PCMCIA Configuration Registers
Bus Interface Logic
Address Buffers
Data buffers
EPROM Control
Common and Attribute Memory Control
Application Specific Functions In PCMCIA memory cards the Memory or Peripheral Logic 88 often consists of memory only and seldom needs additional logic, whilst in PCMCIA I/O cards the Memory or Peripheral Logic 88 is logic intensive and is usually implemented through the use of a manufactures chipset which is placed onto the card using small package types.

The Card Information Structure (CIS) ROM 89 is a memory block on the card that tells the host device what function the card is to perform. This is a byte-wide PROM that exists on every PCMCIA card.

Figure 6:
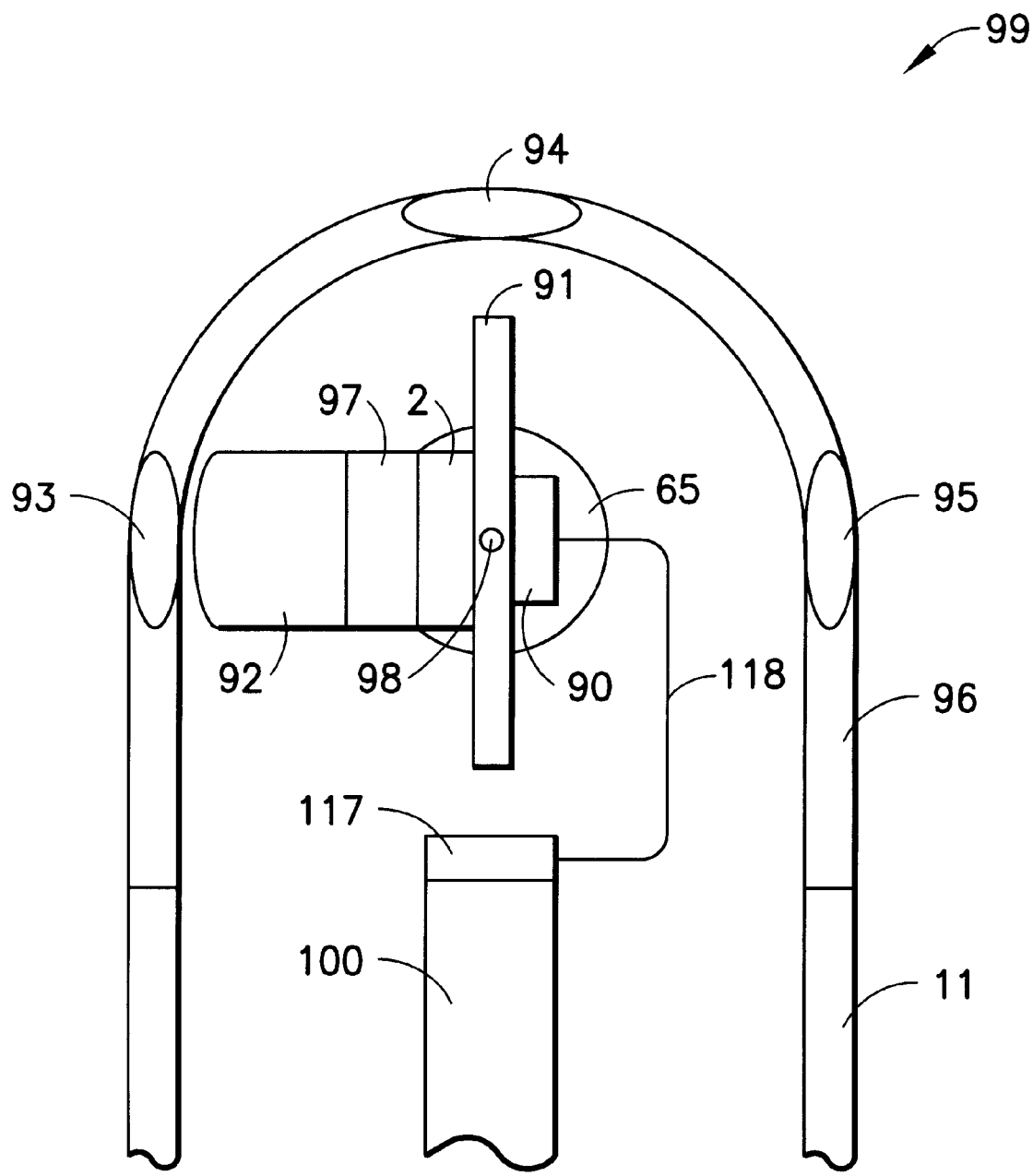
FIG. 6 is a schematic block diagram of the functional elements of a clip-on enclosure for use with the hand held device of FIGS. 1A and 1B.

FIG. 6 is a more detailed schematic block diagram of the functional elements of the clip-on enclosure 99 for use with the Multiphone 20 as shown in FIGS. 1A and 1B. The clip-on enclosure 99 houses a camera 2 which is mounted on a rotational printed circuit board (PCB) 91 centrally located on a pivotal axis 98. The rotational PCB 91 is connected to the Multiphone's motherboard 100 through electrical connectors 117 and 90 via a flexible electrical circuit ribbon 118.

A servo motor 65, controlled by the processor (41, FIG. 3) via a servo controller (64, FIG. 3), can be used to rotate the rotational PCB 91 through 180° into three distinct functional positions. Additionally a thumbwheel (3, FIG. 3), connected to the main body of the Multiphone 20, can be used to rotate the rotational PCB 91 through the use of a gearing mechanism (not shown) which is incorporated into the clip-on enclosure 99.

In each functional position, respective lensing 93, 94, and 95, incorporated in the lens body 96, assists in the correct focusing of the camera 2. Each lens 93, 94, and 95 is manufactured to meet the particular functional requirements of their respective positions, as mentioned previously. The camera 2 is also shrouded from incoming ambient light by the camera shroud 92 which is connected to the rotational PCB 91. The camera shroud 92 may incorporate one or more light sources 97 (e.g. LED's, and/or Laser Diodes) to assist the user in obtaining a good read.

Figure 7:
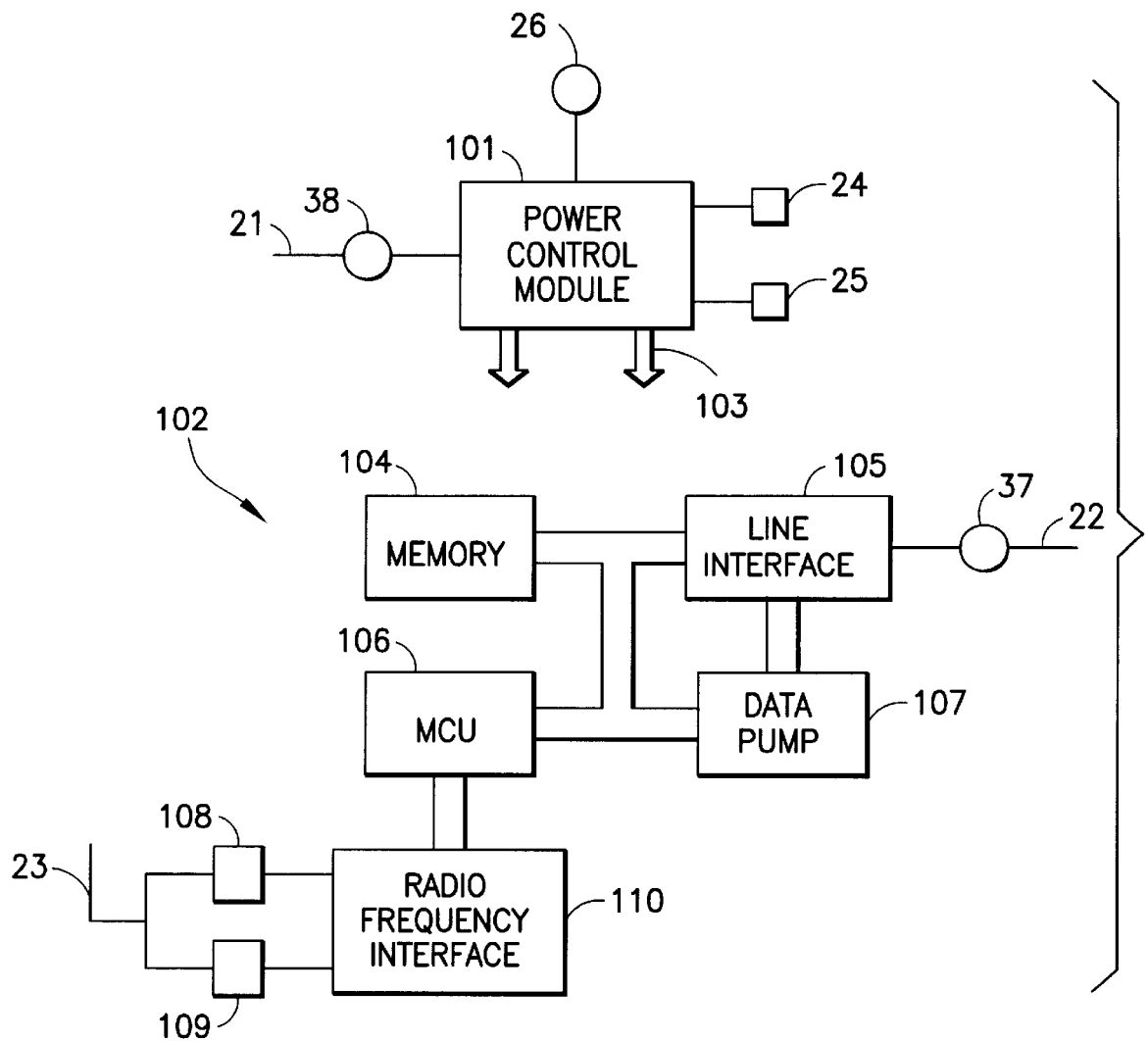
FIG. 7 is a schematic block diagram of the functional elements of a base unit as shown in FIGS. 2A, 2B, 2C and 2D for use with the hand held device of FIGS. 1A, 1B and 3.

FIG. 7 is a schematic block diagram of the functional elements of the base unit 27 of FIGS. 2A, 2B, 2C and 2D. A power control module (PCM) 101 is supplied with electrical power from a standard AC/DC power supply (not shown) via a power cable 21 with a suitable jack plug (not shown) plugged into the plug-in receptacle 38. The PCM 101 is connected to first and second electrical contacts 24 and 25 so that, when the Multiphone 20 is located in the base unit 27, the rechargeable batteries 53 and 57 can be recharged. An indicator light 26 is connected to the PCM 101 and is used to indicate that the rechargeable batteries 53 and 57 are charging. The PCM 101 also supplies power to the other elements of the base unit 27 via supply lines which are represented schematically (for reasons of drawing simplicity) by the arrows 103.

It will be appreciated that in addition to the use of a standard AC/DC power supply for use with the Multiphone 20 and base unit 27 an adapter for connection to, for example, a 12 volt DC supply from a car may also be provided.

A modem 102 is connected via a radio frequency (RF) interface 110 to a RF receiver 108 and a RF transmitter 109. The RF interface 110 converts signals from the RF receiver 108 to data to be passed to the modem 102 and converts data from the modem 102 to signals to be transmitted by the RF transmitter 109. A further interface (e.g. a standard RS232 interface—not shown) for connection to a personal computer (not shown) could also be provided. Also a socket for a connection to a standard telephone handset (not shown) could be provided. The modem 102 can be a conventional modem generally comprising a master control unit 106, a data pump 107 and memory 104. The master control unit 106 is connected to receive data from the RF interface 110 (and/or from a RS232 interface, if a personal computer is connected). Data from the data pump 107 is coupled via a line interface 105 to the telephone line 22 via a standard telephone socket 37. The data pump 107 can also be connected via an audio interface (not shown) to a speaker (not shown) for monitoring the transmission of data via the telephone line 22.

Figure 8:
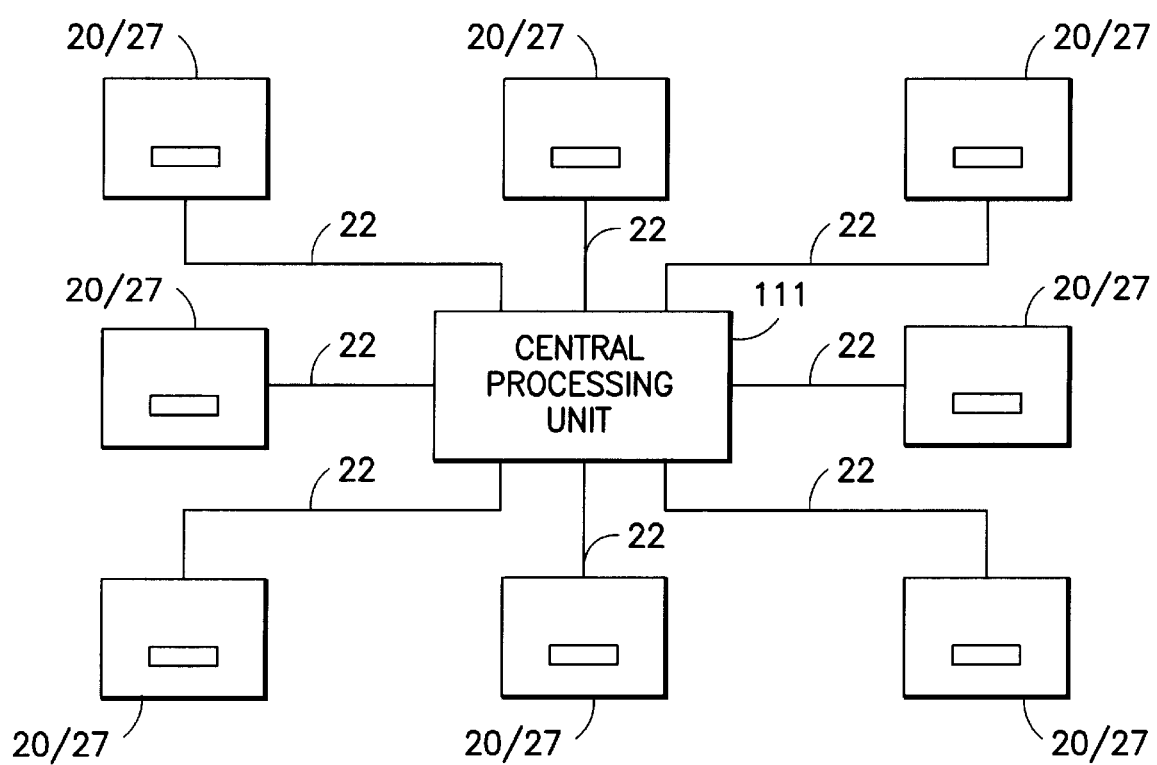
FIG. 8 is an overview of a system comprising a plurality of hand held devices, such as is illustrated in the preceding Figures, linked via respective telephone connections to a Central Processing Unit.

FIG. 8 is a schematic representation of a system comprising a plurality of Multiphone units 20 connected via respective telephone connections 22 (telephone lines, wireless telephone channels, etc.) to a Central Processing Unit 111. In this system data and/or images, and/or stored information can be transmitted and received between the individual Multiphones/base units 20/27 and the Central Processing Unit 111. In a preferred embodiment of the invention, the Multiphones/base units 20/27 are used for the placing of orders for merchandise and the Central Processing Unit 111 processes those orders and dispatches them to the users. Additionally the Central Processing Unit 111 can be used to transmitted and/or receive the following information:

Update information relating to merchandisable items.

Software and/or firmware programs for use with the Multiphone 20.

Still or motion images.

Clearly this list is not exhaustive and as such any information suitable for transmission via a telephone network can be transmitted and/or received.

In a preferred embodiment of the Multiphone 20 the software stored in the ROM (42, FIG. 3) permits the loading of data from the central processing unit or another compatible remote device. The programming is performed using a series of commands preceded by dot codes. The programming commands are thus known as "dot" commands and cover a number of standard operations as will be apparent to one skilled in the art. In this way, a significant amount of catalogue data and/or program software and/or images can be held in the central processing unit and be sent to the Multiphone 20 as and when required. Where programs are to be downloaded, rewritable program storage will be needed in the Multiphone 20, for example by implementing the ROM (42, FIG. 3) in flash PROM technology.

Preferably there is a security system implemented in the Multiphone 20 to prevent the unauthorised updating of data One such security system can be implemented through the use of data encryption. In this system each Multiphone 20 is issued with a unique encryption key from a central processing unit and/or the service provider. Consequently data to be transmitted to that device is encrypted using that devices own specific encryption key. Consequently only that specific Multiphone 20 can successfully receive and decode this transmitted data. As an additional security method the encryption key of each Multiphone 20 can be updated by the central processing unit and/or the service provider at will and/or on each occasion the Multiphone 20 is in contact with the central processing unit and/or service provider. This can be implemented through the use of rewritable program storage in the Multiphone 20, for example by implementing the ROM (42, FIG. 3) in EEPROM technology.

Figure 9:
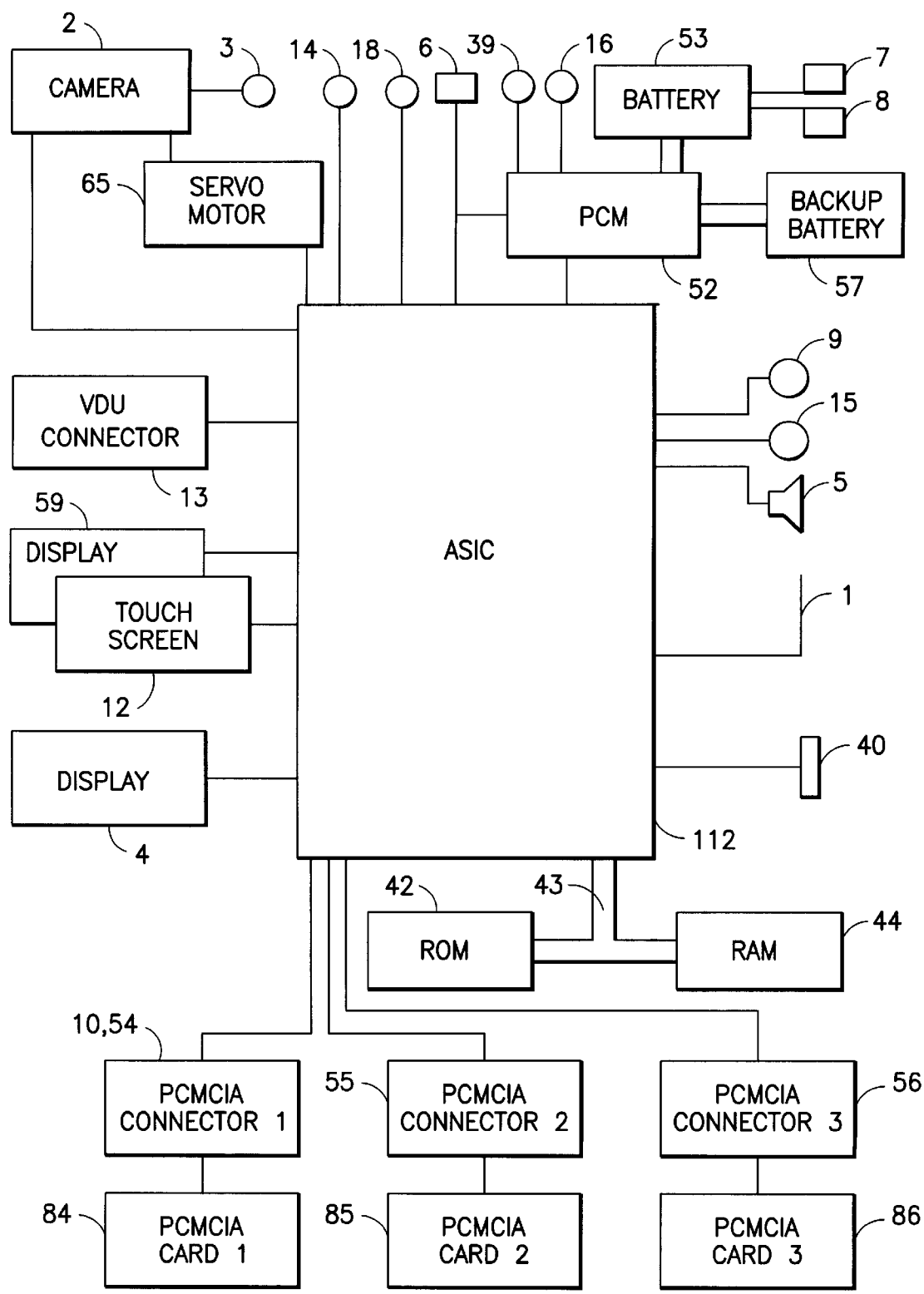
FIG. 9 is a schematic block diagram of the functional elements of a farther example of a hand held device as shown in FIGS. 1A and 1B implemented using an Application Specific Integrated Circuit (ASIC).

The embodiment of FIG. 9 is implemented using an Application Specific Integrated Circuit (ASIC), although a conventional microprocessor and external hardware could be used. Likewise, it will be appreciated that the embodiments described with reference to the previous Figures could also be implemented using an ASIC or other equivalent technology instead of a microprocessor (e.g. a Digital Signal Processor (DSP), and/or Field Programmable Gate Array (FPGA)).

In the embodiment of FIG. 9, the ASIC performs the majority of the necessary processing functions of the device including:

accepting data from the camera 2.

processing the data received from the camera 2.

controlling an interface to the camera 2, the functions of the camera interface 49 being performed in the ASIC.

controlling a servo controller 64 connected to a servo motor 64, the functions of the servo controller 64 being performed in the ASIC.

accepting data from the keypad 6.

controlling an interface to the keypad 6, the functions of the keypad interface 51 being performed in the ASIC.

accepting data from the optional personal computer (PC) keyboard (not shown) via plug-in receptacle 14.

controlling an interface to a standard Personal Computer keyboard (not shown), the functions of the keyboard interface 83 being performed in the ASIC.

driving the indicator 18.

controlling the flow of data in and out of the RAM 44.

controlling the flow of data in and out of the ROM 42.

controlling the flow of data in and out of the video CODEC 50, the functions of the video CODEC 50 being performed in the ASIC.

interfacing with the power control module 52.

implementing the modem function for use with an analogue telephony system and also providing the necessary processing and control for integration with a digital telephony system and/or cellular telephone network.

controlling the loudspeaker 5 and earphone via the earphone plug-in receptacle 15, permitting the progress of calls to be monitored.

accepting input from a microphone 9 to enable the Multiphone in combination with the camera 2 and loudspeaker 5 and earphone (not shown) to operate as a hand set for the purposes of audio and/or visual telephony.

controlling an interface to the displays 4 and 59 and VDU connector 13, the functions of the display interface 45 being performed in the ASIC.

controlling an interface to the touch screen 12, the functions of the touch screen interface 62 being performed in the ASIC.

controlling an interface to an RF transmitter 47 and RF receiver 48 to enable the wireless transfer of data via an RF link to another compatible device, the functions of the RF interface 46 being performed in the ASIC.

controlling an interface to a RS232 connector 40, the functions of the RS232 interface 61 being performed in the ASIC.

controlling a PCMCIA controller 60 connected to the PCMCIA cards 84, 85, and 86, the functions of the PCMCIA controller 60 being performed in the ASIC.

Figure 10:
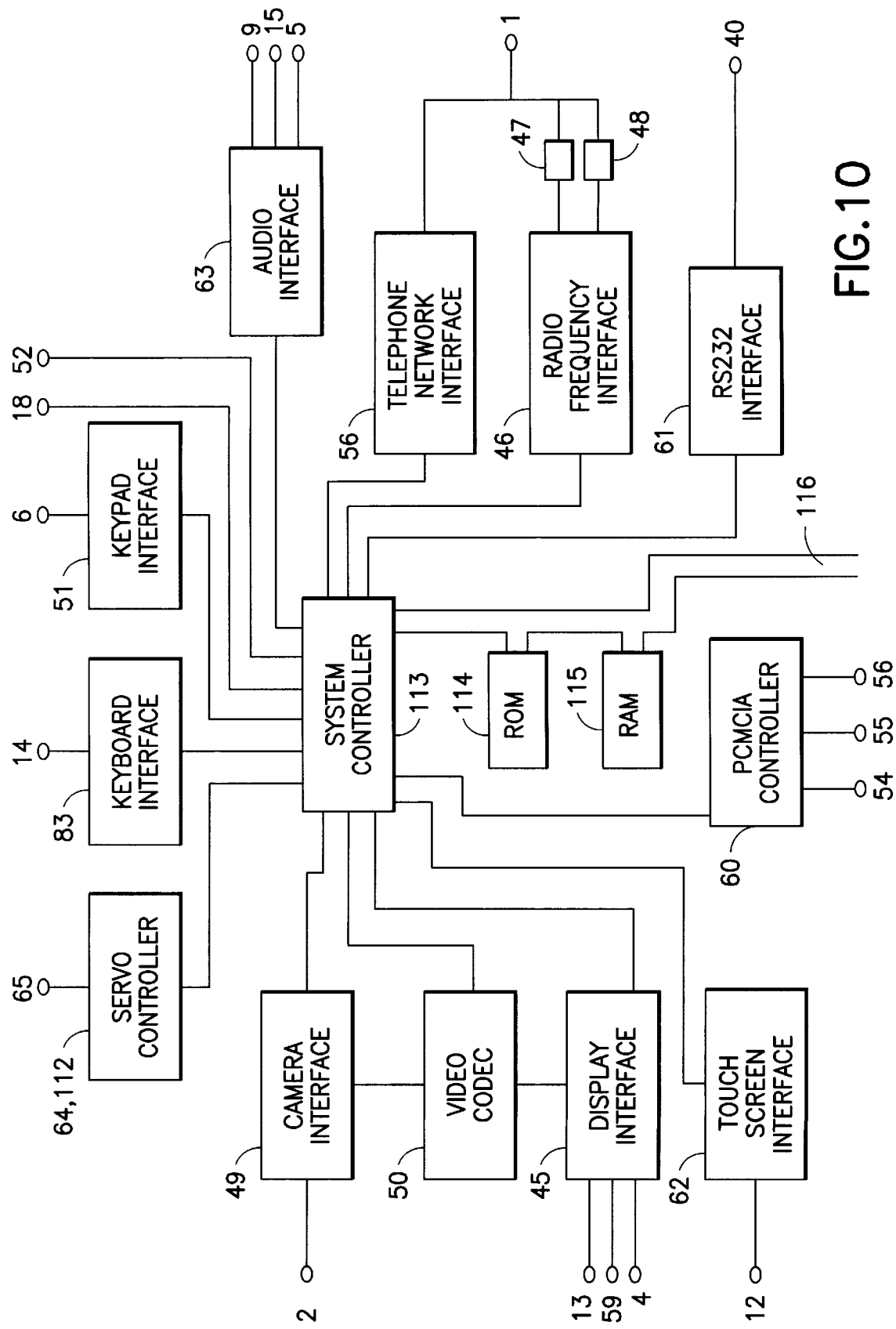
FIG. 10 is a schematic block diagram illustrating components in the ASIC forming part of the apparatus of FIG. 9.

FIG. 10 illustrates in more detail the configuration of the ASIC 112.

The ASIC comprises the system controller 113 that controls the operation of the Multiphone 20 and of its associated components. In this embodiment the system controller 113 consists of a microcontroller core incorporated into the ASIC. In other embodiments it could consist of some other control means using, for example, one or more finite state machines.

The microcontroller receives requests via the internal bus 116 which is connected to the external bus 43 illustrated in FIG. 9. However, in an alternative embodiment where the system controller 113 consist of a number of finite state machines, then control would be by means of the fixed interconnection of the logic in the fixed state machines.

If the system controller 113 is a microcontroller core, then the data that controls its operation is stored in an internal ROM 114 together with the external ROM 42. Alternatively, there could be no internal ROM 114 and the system controller 113 will then obtain all the data from the external ROM 42. Alternatively, again, the internal ROM 114 could be used exclusively without an external ROM 42. However, this would reduce the flexibility of the device. The use of the internal ROM 114 is advantageous where a pre-defined amount of the operations to be performed are fixed for all Multiphone 20 types, whilst the remainder of the operation is dependent on a particular model, to take account for example of language variations, methods used to enter data, etc. The internal RAM 115 in the ASIC can be used by the system controller 113 as a scratch pad RAM to speed up operations and in order to reserve the maximum amount of external RAM 44 for the storage of the main data. This "main data" includes such data as catalogue data and/or program software and/or images which can be down-loaded by telephonic transmissions from a central processing unit.

The internal RAM 115 could be used as a short term data store leaving the external RAM 44 to store the main data, the data in external RAM 44 being retained by the battery 53. An additional backup battery 57 is provided for data retention to prevent the loss of data from the external RAM 44 or the internal RAM 115 in the event of failure of the battery 53.

Signals relating to data captured by the camera 2 are passed via the camera interface 49 to the system controller to be processed. The camera interface 49 also provides the video CODEC 50 with a digital representation of the captured data from the camera 2, where it can be suitably processed for display and/or telephonic transmission.

An indicator light 18, connected to the system controller 113, is used to report successful capture of data and/or images from the Camera 2, and is also used during video teleconferencing to indicate the correct usage of the device The camera interface 49 carries out all the necessary signal conditioning as required on receiving signals from the camera 2. The signal conditioning will depend on the exact configuration of the camera and preferably comprises signal conditioning to enable accurate analogue-to-digital conversion (ADC), with sufficient buffering of the captured data as will be apparent to one skilled in the art.

The system controller 113 can electronically adjust the position of the camera 2 by controlling the servo motor 65 via the servo controller 64. Consequently the user can alter the primary function of the Multiphone 20, via the keypad 6.

The keypad interface 51 responds to the operation of the keypad 6 and ensures that the system controller 113 receives appropriate signals as required by the particular key pressed. The keypad interface 51 also ensures that this signal is devoid of bounce (e.g. resulting from the multiple operation of a key due to the spring operation within the key mechanism). An additional keyboard interface 83, which serves the same function as the keypad interface 51, allows the system controller 113 to receive appropriate signals from a standard Personal Computer (PC) keyboard.

The system controller 113 is interfaced with and receives electrical power from the power control module (PCM) 52.

A display interface 45 enables the system controller 113 to drive the displays 4 and 59 in a conventional manner and also incorporates the necessary logic to drive a standard Video Display Unit (VDU) via the VDU connector 13.

A touch screen interface 62 enables the system controller 113 to sense data from the touch sensitive screen 12 as described previously with reference to FIG. 3.

An audio interface 63, which is controlled by the system controller 113, carries out all the necessary signal conditioning required to allow the microphone 9, the speaker 5 and earphone plug-in receptacle 15 to provide standard audio telephony transmission or to allow the system controller 113 to transfer the data over the telephony network using, in the present embodiment, conventional cellular telephone technology.

The audio interface 63 thus enables the Multiphone 20 to be used as a conventional cellular telephone for the transmission of audio signals. In conventional telephony mode the system controller 113 receives signals from the microphone 9, via the audio interface 63, and performs all the necessary digital signal processing (DSP) operations required to transmit the signal over a telephone network. These digital signal processing operations can comprise, as will be apparent to one skilled in the art, conventional operations of buffering the microphone 9 to filter out any frequencies which are not required for transmission (e.g. any introduced noise and distortion). The system controller 113 then directs this processed signal to the telephone network interface 58 to be transmitted. Received audio data from the telephone network interface 58 is directed via the system controller 113 to the audio interface 63 which performs all the necessary signal conditioning to pass the signal to the speaker 5 and earphone plug-in receptacle 15.

In the data transfer mode, the telephone network interface 58, which incorporates transmitter and receiver logic, allow wireless communication between the Multiphone 20 and any other compatible device, utilising a standard cellular and/or satellite network. The telephone network interface 58 is connected to the aerial 1, which focuses and converts RF energy for reception and transmission into space. The functional elements of the telephone network interface 58 where discussed previously with reference to FIG. 4, and as such will not be discussed again here.

A standard RS232 connector 40, is connected to the system controller 113 via a RS232 interface 61, to allow the connection of other compatible devices to the Multiphone 20, through a standard RS232 cable and/or radio frequency (RF) link.

A radio frequency (RF) interface 46 is also incorporated into the ASIC 112 to convert data to be transmitted into signals for driving the RF transmitter 47, and converts signals from the RF receiver 48 into data to be passed to the system controller 113. The RF transmitter 47 and RF receiver 48 are connected to the aerial 1, which again focuses and converts RF energy for reception and transmission into space. This radio frequency interface 46 consequently enables wireless communication between the Multiphone 20 and any other compatible device.

Lastly the ASIC 112 incorporates a PCMCIA controller 60 to manage the interface between the PCMCIA cards 84, 85, and 86, through the PCMCIA connectors 54, 55, and 56.

Although specific embodiments of the invention have been described hereinabove, it will be appreciated that several modifications and/or additions are possible within the scope of the present invention.

It can be appreciated that other forms of interfaces can be incorporated into the hand held unit to utilise various forms of data transmission (e.g. a fibre optic interface).

As an example, additional elements can be incorporated into the hand held unit to enable the reception of television transmissions via various wire and/or wireless transmissions (e.g. via telephone lines, fibre optic cables, UHF and satellite transmissions) to allow both the viewing of standard television pictures on the display 4 and/or a video display unit (VDU) and/or a standard television. These television pictures can also be compressed and stored in a suitable medium (e.g. a PCMCIA memory card) in the Multiphone 20 and/or a central processing unit. These stored television pictures can then be decompressed on demand and viewed on the display 4 and/or a VDU and/or a standard television to enable a form of video on demand. The television transmissions can also be used to allow the rapid updating of data held in the Multiphone's internal and external memory.

Furthermore it can be appreciated that the hand held unit can be designed to incorporate additional elements such as frequency adjustment logic to allow for the wireless transmission and reception of data over a much wider frequency range (e.g. from 500 Hz to 10 GHz) as required by various potential user applications. In such cases it is conceived that a multi-functional and/or additional aerial would be required.

Although in the presently preferred embodiments described above both the hand held unit and base unit are configured to be substantially rectangular in shape, it will be appreciated that both units could be configured in other shapes as desired by other applications. It will also be appreciated that it may be desirable and/or necessary to change the position of each constituent element of both the hand held unit and base unit to maximise such design factors as reliability, maintainability, and ergonomics.

I claim:

1. A personal communication device, comprising:
   a display for displaying data and video signals;
   a loudspeaker for generating an audible signal;
   a microphone for receiving an audio signal;
   a keypad for entering data;
   a telecommunications interface for receiving and transmitting information; and
   an internal multi-position and multi-function reading head for producing an image signal when in a first position using a first lensing and for reading for image conversion using a second lensing when in a second position.

2. The device of claim 1, wherein the reading head is a camera.

3. The device of claim 1, wherein the reading head is a laser diode.

4. The device of claim 1, wherein the reading head is part of a clip-on unit.

5. The device of claim 1, wherein the reading head includes a rotational pivot which rotates to three positions.

6. The device of claim 5, further comprising respective lensing at each of the three positions.

7. The device of claim 1, wherein the reading head includes a rotational reflective mirror.

8. The device of claim 1, wherein the reading head includes a light source.

9. The device of claim 8, wherein the reading head further includes a shroud for the light source.

10. The device of claim 1, further comprising a thumbwheel for controlling the reading head.

11. The device of claim 1, further comprising a servo motor for controlling the reading head.

12. The device of claim 1, wherein the reading head and display are configured to allow simultaneous viewing of an object and the image signal representing the object.

13. The device of claim 1, wherein the image signal is MPEG-4 compatible.

14. The device of claim 1, wherein the reading head is for reading coded data, and the display is for displaying material corresponding to the coded data.

15. The device of claim 14, wherein the coded data represents product identification codes.

16. The device of claim 1, wherein the telecommunications interface is for cellular communication.

17. The device of claim 1, wherein the telecommunications interface is for wireline communication.

18. The device of claim 1, wherein the telecommunications interface is for satellite communication.

19. The device of claim 1, wherein the microphone, display and reading head are configured so that when the device is used as a telephone handset, a user can speak to the microphone while viewing an image on the display, and the reading head can pick up a frontal facial image of the user.

20. The device of claim 1, further comprising encryption and decryption means having a key updatable via the telecommunications interface.

21. The device of claim 1, wherein the telecommunications interface includes frequency adjustment logic.

22. The device of claim 1, wherein the device is a handheld unit.

23. The device of claim 1, wherein the device consists of a handheld unit and a base unit connected by a wireless bidirectional data link.

24. The device of claim 1, further comprising a plug for an earphone.

25. The device of claim 1, further comprising interfaces for a keyboard and a video display unit.

26. The device of claim 1, further comprising a radio frequency (RF) interface.

27. The device of claim 1, further comprising an interface for a PCMCIA card.

28. The device of claim 1, further comprising a television receiver.

29. The device of claim 28, further comprising storage for at least one television picture.

30. The device of claim 1, further comprising rewritable storage, and means for selecting contents of the rewritable storage for display.

31. The device of claim 1, further comprising microphone noise reduction circuitry.

32. The device of claim 1, further comprising a touch screen.

33. The device of claim 1, further comprising means for verifying the identity of a user.

34. The device of claim 33, wherein the means for verifying is a recognizer for recognizing a written signature.

35. The device of claim 33, wherein the means for verifying is a recognizer for recognizing a fingerprint.

36. The device of claim 33, wherein the means for verifying is a recognizer for recognizing an image of the user.

37. The device of claim 1, wherein the device is a handheld unit, and the reading head includes a rotational pivot which rotates to three positions, and further comprising:

> respective lensing at each of the three positions;
> a thumbwheel for controlling the reading head;
> interfaces for a keyboard and a video display unit;
> an interface for a PCMCIA card; and
> a touch screen.

38. A personal communication system, comprising:

> a display for displaying data and video signals;
> a loudspeaker for generating an audible signal;
> a microphone for receiving an audio signal;
> a keypad for entering data;
> a telecommunications interface for receiving and transmitting information;
> a first interchangeable reading head for producing an image signal; and
> a second interchangeable reading head for one of character reading or encoded material scanning.

39. The device of claim 38, wherein the interchangeable reading head is part of a clip-on unit.

40. A communications system, comprising:

> a plurality of personal communication devices, each of the personal communication devices including:
> > a display for displaying data and video signals,
> > a loudspeaker for generating an audible signal,
> > a microphone for receiving an audio signal,
> > a keypad for entering data,
> > a telecommunications interface for receiving and transmitting information, and
> > an internal adjustable multi-function reading head moveable through a range of 180 degrees and having multiple settable positions, a first of the positions having a first lensing for producing an image signal and a second of the positions having a second lensing different from the first; and
> a central processing facility for communicating with the plurality of personal communication devices.

41. A communications system, comprising:

> a plurality of personal communication devices, at least one of the personal communication devices including:
> > a display for displaying data and video signals,
> > a loudspeaker for generating an audible signal,
> > a microphone for receiving an audio signal,
> > a keypad for entering data,
> > a telecommunications interface for receiving and transmitting information, and
> > a first interchangeable reading head for producing an image signal;
> at least another of the personal communication devices including
> > a display for displaying data and video signals,
> > a loudspeaker for generating an audible signal,
> > a microphone for receiving an audio signal,
> > a keypad for entering data,
> > a telecommunications interface for receiving and transmitting information, and
> > an internal adjustable multi-function reading head moveable through a range of 180 degrees and having multiple settable positions, a first of the positions having a first lensing for producing an image signal and a second of the positions having a second lensing different from the first; and
> a central processing facility for communicating with the plurality of personal communication devices.

* * * * *